(12) United States Patent
Polzer

(10) Patent No.: US 10,390,392 B2
(45) Date of Patent: Aug. 20, 2019

(54) METHOD FOR CONTROLLING AN OUTPUT OF AN ELECTRICAL AC VOLTAGE

(71) Applicant: Rudolf Polzer, Stein (DE)

(72) Inventor: Rudolf Polzer, Stein (DE)

(*) Notice: Subject to any disclaimer, the term of this patent is extended or adjusted under 35 U.S.C. 154(b) by 0 days.

(21) Appl. No.: 15/623,061

(22) Filed: Jun. 14, 2017

(65) Prior Publication Data

US 2017/0359871 A1 Dec. 14, 2017

(30) Foreign Application Priority Data

Jun. 14, 2016 (DE) .................. 10 2016 210 517

(51) Int. Cl.
*H05B 33/08* (2006.01)
*H02M 1/08* (2006.01)
*H02M 7/06* (2006.01)

(52) U.S. Cl.
CPC ........ *H05B 33/0815* (2013.01); *H02M 1/083* (2013.01); *H02M 7/06* (2013.01); *H05B 33/0809* (2013.01); *H05B 33/0845* (2013.01)

(58) Field of Classification Search
CPC ............... H05B 33/08; H05B 33/0809; H05B 33/0815; H05B 33/0845; H05B 37/02; H02M 1/08; H02M 1/081; H02M 1/088
See application file for complete search history.

(56) References Cited

U.S. PATENT DOCUMENTS

| | | | |
|---|---|---|---|
| 4,447,765 A | 5/1984 | Cote | |
| 5,489,839 A | 2/1996 | Burns et al. | |
| 5,519,311 A * | 5/1996 | Widmayer | H02M 5/293 315/194 |
| 5,652,504 A * | 7/1997 | Bangerter | G05F 1/45 323/211 |
| 9,769,894 B2 * | 9/2017 | Chowdhury | H05B 33/0815 |
| 2011/0140620 A1 * | 6/2011 | Lin | H05B 33/0845 315/224 |

FOREIGN PATENT DOCUMENTS

| | | |
|---|---|---|
| DE | 3317648 A1 | 11/1983 |
| DE | 10026661 A1 | 12/2001 |
| DE | 10 2014 221 511 A1 | 4/2016 |

* cited by examiner

*Primary Examiner* — Thai Pham
(74) *Attorney, Agent, or Firm* — Boyle Fredrickson S.C.

(57) ABSTRACT

A method for controlling an output of an electrical AC voltage U comprising the following steps: switching on a current flow I induced by the AC voltage as soon as an absolute value of the AC voltage U exceeds a switching-off target voltage, and switching on the current flow I as soon as the absolute value for the AC voltage U falls below a switching on target voltage. The switching-off target voltage and the switching-on target voltage are defined as positive and the switching-on target voltage is lower than or equal to the switching-off target voltage. The method according to the invention serves to dim an LED lamp in a brightness range of 0% to 100% of a maximum brightness of the LED lamp.

22 Claims, 2 Drawing Sheets

METHOD FOR CONTROLLING AN OUTPUT OF AN ELECTRICAL AC VOLTAGE

FIELD OF THE INVENTION

The present invention relates to a method for controlling an output of an electrical AC voltage. Furthermore, the invention relates to a dimmer for an electrical AC voltage as well as an assembly of such a dimmer having a lamp comprising at least one LED element.

BACKGROUND OF RELATED ART

Methods for controlling an output of an AC voltage are used in particular in dimmers for controlling the brightness of lamps. Known methods for controlling the output are the phase trailing-edge control and phase leading-edge control, for example. With the phase leading-edge control, a current flow delayed after the zero crossing of the AC voltage is switched on. With the phase trailing-edge control, the current flow is already switched off prior to the zero crossing of the AC voltage.

In case of capacitively coupled loads, methods of this type have the disadvantage, that the switching-on procedures of the current flows result in large voltage differences, in particular to a change in the sign of the voltage at the capacitors. The large voltage differences lead to undesired current pulses, which cause disruptions, and can damage components. In particular, these methods are not suitable for dimming LED lamps when the LED lamps are connected to an AC voltage network via a rectifier and a coupling capacitor. So far, such LED lamps have been regarded as not dimmable.

SUMMARY OF THE INVENTION

The object of the present invention is thus to create an improved method for controlling an output of an AC voltage with which current pulses of this type can be avoided, such that LED lamps can be dimmed with this method.

This object is achieved according to the invention by a method having the features in Claim 1.

The method according to the invention is distinguished in that a current flow induced by the applied AC voltage is always then interrupted when the absolute value of the AC voltage exceeds a switching-off target voltage. The switching-on of the current flow then occurs when the absolute value of the AC voltage again falls below a switching-on target voltage, wherein the switching-on target voltage is lower than or equal to the switching-off target voltage. The switching-on target voltage and the switching-off target voltage are defined hereby as positive. With a switching regulation of this type, it is ensured that the AC voltage does not pass through a zero crossing between the switching off and the switching on. The AC voltage thus does not change signs between the switching off and the switching on. Voltage differences at the capacitor connected thereto are reduced between the switching procedures. Undesired current pulses resulting from the voltage differences are reduced and in particular, damages are prevented.

The applied AC voltage is a mains AC voltage in particular. For a periodic AC voltage with a defined frequency, the temporal course of the AC voltage is clearly determined. There is a fixed relationship between the absolute value of the AC voltage and the time axis. The switching-off and switching-on target voltages thus can be assigned to periodically repeating points in time at which the current flow is switched on or off. The method can thus also be defined through the specification of switching-on and switching-off points in time.

The AC voltage that is switched on and off by means of the method is applied as an input voltage to at least one LED lamp. The current is thus switched on and off in the lead to the LED lamp. As a result, a dimming of the LED lamp is enabled, without it having to contain an integrated switch-mode power supply.

A brightness of the LED lamp can be controlled in a brightness range of 0% to 100% of a maximum brightness of the LED lamp. Currently known dimmable LED lamps can be dimmed in a limited brightness range. By means of the method according to the invention, the full brightness range can be exploited, including that below 10% of the LED lamp. In particular, it is possible to control the brightness of the LED lamp in a brightness range of 0% to 20%, in particular from 0% to 15%, and in particular from 0% to 10%.

If the output serves to operate numerous LED lamps, the latter can be grouped in particular in a parallel circuit. Furthermore, the individual LED lamps can each comprise a capacitive mains adapter having an input-side coupling capacitor.

The switching-on target voltage is preferably substantially equal to the switching-off target voltage. This is to be understood to mean that the difference between the switching-off target voltage and the switching-on target voltage is less than twice the voltage that drops at a smoothing capacitor for the LED lamp. By way of example, it may be provided that the switching-on target voltage is at least 80%, in particular at least 90%, in particular at least 99% of the switching-off target voltage. As a result, voltage differences during the switching on and off of the current flow are further reduced. Disruptive current pulses are consequently prevented. It is ensured in particular that the difference between the switching-off target voltage and the switching-on target voltage is smaller than the voltage drop at a connected load.

A substantial equivalence of the switching-on target voltage and the switching-off target voltage has the further advantage that the current flow is symmetrically interrupted on both sides of the maximum absolute value of the applied AC voltage. This ensures that the average current flow is approximately proportional to the switching-on target voltage and/or to the switching-off target voltage. The output can thus be quantified via the switching-on target voltage and/or the switching-off target voltage.

Advantageously, the switching-on target voltage and/or the switching-off target voltage can be set in an adjustable manner. This has the advantage that the output can be adjusted. The output can also be defined indirectly via a switching-on target voltage and/or switching-off target voltage that can be set in an adjustable manner.

Moreover, the invention relates to a dimmer for connecting to an electrical AC voltage having the features of the independent claim 4. The dimmer according to the invention is also suitable for loads that cannot be operated with a voltage that is controlled by means of a phase leading-edge control or phase trailing-edge control.

The dimmer according to the invention comprises a switch element for switching a current flow induced by the AC voltage on and off. Moreover, a control element is provided, which provides for the switching on and off of the current flow in accordance with the method outlined above by means of a control voltage. The advantages of this dimmer correspond to those of the method according to the invention.

The dimmer preferably has a rectifier for the applied AC voltage. With rectified voltage, the switch element can be designed as a transistor. This provides for an economical and simple construction of the dimmer.

The control element can comprise a potentiometer. The switching-off target voltage and the switching-on target voltage can be set in an adjustable manner with the potentiometer.

Furthermore, the invention relates to an assembly having a dimmer and at least one lamp, which has at least one LED element. The advantages of this assembly correspond to those of the method and/or the dimmer of the present invention.

BRIEF DESCRIPTION OF THE DRAWINGS

An exemplary embodiment of the invention shall be explained below based on the drawings. Therein.

DETAILED DESCRIPTION OF THE PREFERRED EMBODIMENTS

Figure 1:
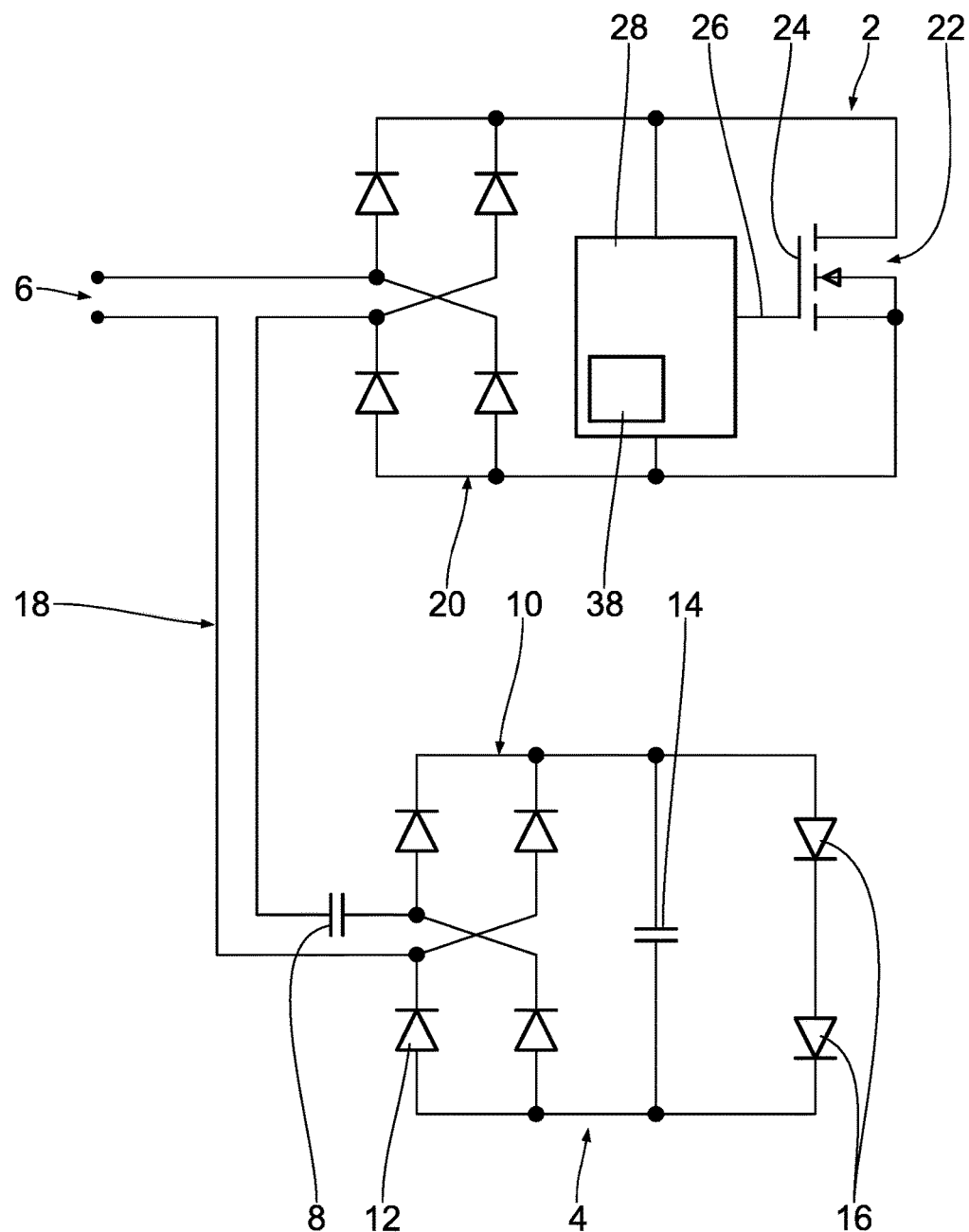
FIG. 1 shows a schematic circuit diagram for an assembly having a dimmer and an LED lamp.

FIG. 1 shows circuit diagram of an assembly comprising a dimmer 2 and an LED lamp 4. The dimmer 2 and the LED lamp 4 are connected to a voltage source 6. A periodic AC voltage U is provided by the voltage source 6, in particular a mains AC voltage.

The LED lamp 4 comprises an input-side coupling capacitor 8 for limiting the flowing current. A rectifier 10 composed of four diodes 12 is connected to the coupling capacitor 8. The rectifier 10 serves to convert an input AC voltage to a DC voltage. In order to smooth the DC current, a smoothing capacitor 14 is connected downstream of the rectifier 10. Two LED elements 16 are connected in series for converting the DC current to light. Alternatively, the LED lamp 4 can also comprise one or more than two LED elements 16.

LED lamps 4 of this type are known. They have the disadvantage that a brightness emitted from the LED elements 16 cannot be dimmed by means of conventional dimmers. Furthermore, an undisrupted operation is not ensured with conventional dimmers. The reason for this is that the voltage jumps caused by conventional dimmers induce disruptive current pulses at the capacitors 8 and 14. These current pulses cause disruptive noise and can damage components of the LED lamp or the conventional dimmer.

In the assembly shown here, the LED lamp 4 is connected via a connecting lead 18 to the dimmer 2 and the voltage source 6. The dimmer 2 has an input-side rectifier 20, which corresponds to the rectifier 10 of the LED lamp 4 in terms of its construction and function. The rectifier 20 is connected to a switch element 22, which serves to switch the current on and off.

In the present exemplary embodiment, the switch element 22 is a transistor, in particular a normal blocking metal-oxide-semiconductor field-effect transistor (MOSFET). This means that without control voltage, the MOSFET 22 blocks the current flow through the dimmer 2. In order to enable current flow, a gate 24 of the MOSFET 22 is connected to a control output 26 of a control element 28. The control element 28 can use voltage dropping via the MOSFET 22 for its own current supply. The voltage dropping via the MOSFET 22 is proportional to the value for the AC voltage U when the transistor is switched off and no voltage is applied to the load. The control element 28 can induce a control voltage at the gate 24 via the control output 26. With an induced control voltage the MOSFET 22 becomes conducting. Applying the control voltage at the gate 24, a current flow through the LED lamp 4 can be switched on. The switching off or interrupting of the current flow is obtained through the control element 28 by switching the control voltage at the gate 24 off. The current flow through the dimmer 2 is thus switched on and off by the control element 28. In particular, a current flow is only possible when a control voltage is applied to the gate 24 of the MOSFET 22. By switching the current flow on and off by means of the dimmer 2, the voltage and output tapped into by the connecting lead 18 is varied.

Figure 2:
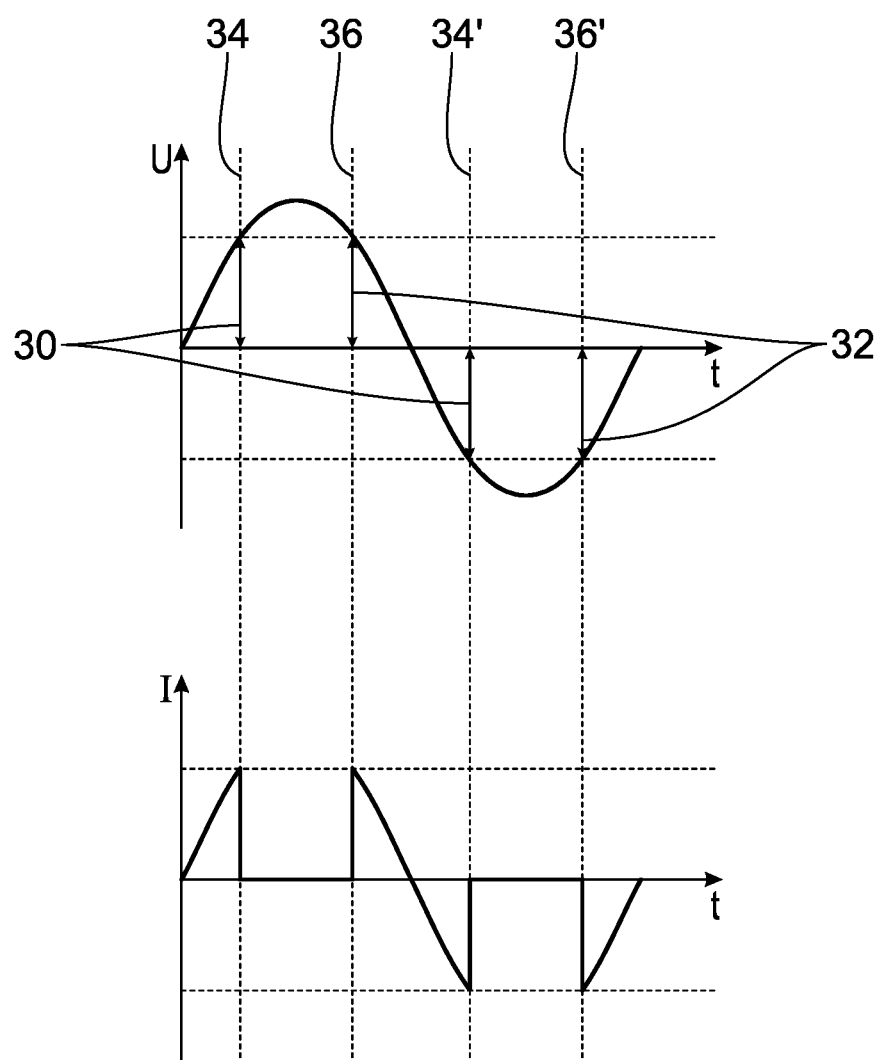
FIG. 2 shows a temporal course of a period of an applied AC voltage as well as a current flow that is switched on and off according to the method according to the invention, when an ohmic load is connected thereto.

The method for switching the dimmer shall be explained below, based on FIG. 2. For this, the temporal course of a period of the applied AC voltage U is depicted in FIG. 2. For this, the curve of the AC voltage U is plotted along the time axis t. Moreover, a current I flowing through the dimmer 2 is plotted over the time axis t in FIG. 2, when an ohmic load is connected thereto. When an LED lamp 4 is connected, the current flow is approximately proportional to the derivation of the voltage over time.

The AC voltage U runs in a sine wave over time t. This means that it passes through a zero crossing at the start of the depicted period, at the middle of the depicted period, and at the end of the depicted period in each case. After passing through the first zero crossing at the start of the period, the AC voltage U increases, and thus its absolute value increases. Because the control element 28 applies a control voltage at the gate 24 of the MOSFET 22 at this point in time, the current I also flows, which is approximately proportional to the derivation of the AC voltage as a function of time. When the absolute value for the AC voltage U exceeds a switching-off target voltage 30, the control element 28 switches the control voltage at the gate 24 off, and the MOSFET 22 blocks the current flow. The current I decreases abruptly to 0. After passing through its maximum, the AC voltage U decreases. As soon as the absolute value of the AC voltage falls below a switching-on target voltage 32, the control element 28 applies a control voltage to the gate 24, and activates the MOSFET 22. The current I is again applied abruptly.

When the MOSFET 22 is blocked, the current flow I is interrupted.

In order to obtain the advantages of the method described above, it is necessary that the switching-off target voltage 30 and the switching-on target voltage 32 are defined as positive. The switching-on target voltage 32 must not be greater than the switching-off target voltage 30. In the example shown here, the switching-on target voltage 32 is substantially equal to the switching-off target voltage 30. This means that the switching-on target voltage 32 is at least 80%, in particular at least 90%, in particular at least 99% of the switching-off target voltage 30. The difference between the switching-off target voltage 30 and the switching-on target voltage 32 is less than twice the drop in voltage at the smoothing capacitor 14. As a result, voltage jumps at the capacitors 8, 14 of the LED lamp 4 are prevented. Disruptive current pulses at the capacitors 8, 14 are avoided.

By switching on and off, the current flow I is temporally interrupted. It is interrupted in particular in the ranges of the maximum absolute value of the AC voltage U. As a result, the average current flow, and thus the output tapped at the connecting lead 18, is reduced. If the switching-off target voltage 30 and the switching-on target voltage 32 are substantially equal, the average current flow as well as the output applied to the LED lamp 4 are approximately proportional to the switching-off target voltage 30 or the switching-on target voltage 32. The power applied to the LED lamp 4 can thus be controlled continuously by defining the switching-off target voltage 30 and the switching-on target voltage 32. As a result, it is possible to control the brightness of the LED lamp 4 in a brightness range of 0% to 100% of the maximum brightness of the LED lamp 4.

Because the temporal course of the AC voltage U is predefined, the exceeding of the switching-off target voltage 30 can be assigned to a switching-off point in time 34. The switching on when the voltage has fallen below the switching-on target voltage 32 can be assigned to a switching-on point in time 36. In the time interval from the switching-off point in time 34 to the switching-on point in time 36, the current flow I is zero.

After the current flow I has been switched back on at the switching-on point in time 36, the absolute value of the AC voltage U decreases until the AC voltage U passes through a zero crossing. Because the absolute value of the AC voltage U is independent of the sign of the AC voltage U, the switching procedures are also carried out when the poles are reversed. The switching off of the current flow I occurs here at a switching-off point in time 34', the switching back on of the current flow I occurs at a switching-on point in time 36'.

Due to the periodic course of the AC voltage U, the switching-off points in time 36, 36' and the switching-on points in time 34, 34' correlate with twice the frequency of the AC voltage U. The periodic temporal course of the AC voltage makes it possible thereby to define the switching procedures by means of the switching points in time 34, 34', 36, 36', instead of the target voltages 30, 32. The control element 28 can thus also be designed as a timer correlated with the periodicity of the AC voltage U, which defines the switching points in time 34, 36, 34', 36' through the temporal course of the control voltage.

Other circuits can also be used for the dimmer. The exemplary embodiment shown here has the advantage of a simple and robust construction.

The important aspect of the dimmer is that a switch element 22 is provided with which the current flow can be switched on and off, and that a control element 28 is provided, which controls the switch element 22. The control element 28 equalizes the absolute value of the applied AC voltage U to a switching-off target voltage 30 and/or a switching-on target voltage 32. In order to set these target voltages, it is advantageous when the control element 28 includes a potentiometer 38, with which the target voltages 30, 32 can be set.

Alternatively to the normal blocking MOSFET 22, a normal conducting MOSFET may be provided. This means that the current I flows in the absence of a control voltage at the control output 26 of the control element 28. The current I is then switched off by applying the control voltage.

In an exemplary embodiment that is not shown, numerous LED lamps connected in parallel are connected to the dimmer, each of which comprises an input-side coupling capacitor.

The invention claimed is:

1. A method for controlling an output of an electrical AC voltage, comprising the following steps:
    (a) switching off a current flow induced by the AC voltage as soon as an absolute value of the AC voltage exceeds a switching-off target voltage, and
    (b) switching on a current flow as soon as the absolute value of the AC voltage falls below a switching-on target voltage,
    wherein:
        the switching-off target voltage and the switching-on target voltage are positive,
        the switching-on target voltage is lower than or equal to the switching-off target voltage,
        the output of the electrical AC voltage controlled in steps (a) and (b) is applied as an input to an input-side coupling capacitor connected to at least one LED lamp, and
        a brightness of the at least one LED lamp can be controlled in a brightness range of 0% to 100% of a maximum brightness of the at least one LED lamp.

2. The method according to claim 1, wherein the switching-on target voltage is substantially equal to the switching-off target voltage.

3. The method according claim 1, wherein at least one of the switching-on target voltage and the switching-off target voltage is variable.

4. The method of claim 1, wherein the electrical AC voltage comprises mains AC voltage and wherein current flow is only switched off once during each half cycle of the electrical AC voltage.

5. A dimmer for controlling an output of an electrical AC voltage, comprising:
    (a) a dimmer circuit comprising:
        a switch element configured to switch a current flow induced by the AC voltage on and off providing a controlled output of the electrical AC voltage, and
        a control element connected to the switch element, the control element configured to (i) supply a control voltage to the switch element and switching the switch element on when an absolute value of the AC voltage falls below a positive switching-on target voltage, and (ii) stop supplying the control voltage to the switch element and switching the switch element off when the absolute value of the AC voltage rises above a positive switching-off target voltage, and
        wherein the switching-on target voltage is about equal to the switching-off target voltage, and
    (b) at least one LED lamp driven by the controlled output of the electrical AC voltage.

6. The dimmer according to claim 5, further comprising a rectifier connected to the switch element, wherein the switch element comprises a transistor, and wherein the control element is configured enable adjustable setting of at least one of (i) the switching-on target voltage, and (ii) the switching-off target voltage.

7. The dimmer according to claim 6, wherein the control element comprises a potentiometer, and wherein the switch element is configured to provide a controlled output of the electrical AC voltage comprised of the output of the electrical AC voltage when the switching element is switched on by the control element.

8. The dimmer according to claim 5, wherein the at least one LED lamp comprises an input-side coupling capacitor, and wherein the controlled output of the electrical AC voltage is provided to the input-side coupling capacitor.

9. The dimmer according to claim 5, wherein the switch element comprises a transistor, and wherein the control element comprises a control output connected to the transistor through which the control voltage from the control element is applied to the transistor.

10. The dimmer according to claim 5, wherein the control element is configured to adjustably set at least one of (i) the switching-off target voltage, and (ii) the switching-on target voltage.

11. The dimmer according to claim 10, wherein the control element comprises a potentiometer used to adjust (i) the switching-off target voltage, and (ii) the switching-on target voltage.

12. The dimmer according to claim 5, wherein the switch element comprises a MOSFET.

13. The dimmer according to claim 5, further comprising a rectifier electrically connected to the electrical AC voltage, the control element, and the switch element, wherein the switch element comprises a transistor, and wherein the control element comprises a potentiometer configured to adjustably set (i) the switching-off target voltage, and (ii) the switching-on target voltage.

14. The dimmer according to claim 13, wherein the transistor comprises a normal blocking MOSFET.

15. The dimmer according to claim 5, wherein the at least one LED lamp is each comprised of a plurality of LED elements.

16. The dimmer according to claim 5, wherein the at least one LED lamp is comprised of a plurality of LED lamps.

17. The dimmer according to claim 5, wherein the at least one LED lamp comprises an input-side coupling capacitor, a rectifier, and at least one LED element.

18. The dimmer according to claim 5, wherein (a) the LED lamp is comprised of (i) at least one LED element, and (ii) at least one capacitor connected in parallel to the at least one LED element, and (b) the switching-on target voltage is (i) not greater than the switching-off target voltage, and (ii) within 99% of the switching-off target voltage.

19. The dimmer according to claim 5, wherein the control element is configured such that the controlled output is maintained at a positive AC voltage.

20. The dimmer of claim 5, wherein the electrical AC voltage comprises mains AC voltage and wherein current flow is only switched off by the switch element once during each half cycle of the electrical AC voltage.

21. A dimmer for controlling an output of an electrical AC voltage, comprising:
  (I) a dimmer circuit comprising:
    (a) a MOSFET configured to switch a current flow induced by the AC voltage and provide a controlled output voltage outputted from the dimmer circuit;
    (b) a control element connected in parallel with the MOSFET, the control element having a control output connected to the MOSFET, and the control element configured to (i) switch on the MOSFET when an absolute value of the AC voltage falls below a switching-on target voltage, and (ii) switch off the MOSFET when the absolute value of the AC voltage rises above a switching-off target voltage; and
    (c) a first rectifier connected in parallel with (i) the MOSFET, and (ii) the control element; and
  (II) at least one LED lamp comprising:
    (a) at least one LED element;
    (b) at least one smoothing capacitor connected in parallel with the at least one LED element;
    (c) a second rectifier connected in parallel with (i) the at least one LED element, and (ii) the at least one smoothing capacitor; and
    (d) a coupling capacitor connected to the dimmer circuit and receiving the controlled output voltage that drives the at least one LED lamp.

22. The dimmer according to claim 21, wherein the control element further comprises a potentiometer configured to adjustably set the switching-on target voltage and the switching-off target voltage, and wherein the at least one LED lamp is comprised of one of a plurality of LED lamps and LED elements, and wherein the control output of the control element is connected to a gate of the MOSFET applying a control voltage to gate of the MOSFET that switches on the MOSFET when an absolute value of the AC voltage falls below a switching-on target voltage and which ceases applying the control voltage to the gate of the MOSFET switching off the MOSFET when the absolute value of the AC voltage exceeds a switching-off target voltage.

* * * * *